United States Patent [19]

Henn et al.

[11] Patent Number: 4,790,240
[45] Date of Patent: Dec. 13, 1988

[54] MACHINE FOR BREWING HOT BEVERAGES

[75] Inventors: Stefan Henn; Rudolf Maass, both of Solingen, Fed. Rep. of Germany

[73] Assignee: Robert Krups Stiftung & Co. KG., Solingen, Fed. Rep. of Germany

[21] Appl. No.: 184,683

[22] Filed: Apr. 22, 1988

[30] Foreign Application Priority Data

Apr. 24, 1987 [DE] Fed. Rep. of Germany ... 8705964[U]

[51] Int. Cl.$^4$ ............................................. A47J 31/00
[52] U.S. Cl. ....................................... 99/282; 99/283; 99/305
[58] Field of Search ................. 99/282, 281, 280, 279, 99/283, 295, 299, 300, 304, 305, 307; 426/433

[56] References Cited

U.S. PATENT DOCUMENTS

| | | | |
|---|---|---|---|
| 3,450,024 | 6/1969 | Martin | 99/295 |
| 3,596,588 | 8/1971 | Moss | 99/282 |
| 4,083,295 | 4/1978 | Hollingsworth | 99/283 |
| 4,354,427 | 10/1982 | Filipowicz | 99/295 |
| 4,548,129 | 10/1985 | van der Sluys | 99/282 |

Primary Examiner—Robert W. Jenkins
Attorney, Agent, or Firm—Peter K. Kontler

[57] ABSTRACT

The housing of a machine for brewing coffee, tea or other hot beverages confines or carries a water container, a riser which conveys water from the container past an electric heater and into a manifold, and a filter holder. The manifold has two sections which are separably connected to each other to define an inlet connected with the riser, a first outlet which can deliver hot water to the filter holder, and a second outlet which can return water into the container. A disc-shaped valving element has a central portion clamped between the two sections of the manifold and a marginal portion which can snap over from a first position, in which the valving element seals the inlet of the manifold from the first outlet, to a second position in which the valving element seals the inlet from the second outlet of the manifold. The valving element assumes the first position when the temperature of water flowing from the riser is too low for admission into the filter holder, and the valving element automatically assumes the second position when the water temperature is adequate for admission of hot water into the filter holder where the water comes in contact with comminuted coffee beans, comminuted tea leaves or with another flavoring agent. A single screw suffices to couple the sections of the manifold to each other and to clamp the median portion of the valving element between the sections.

26 Claims, 4 Drawing Sheets

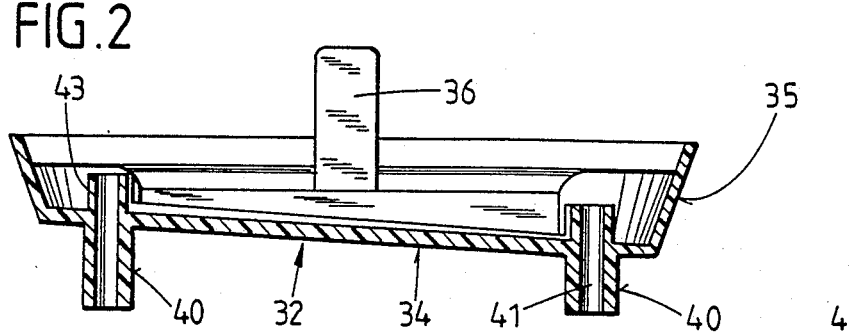
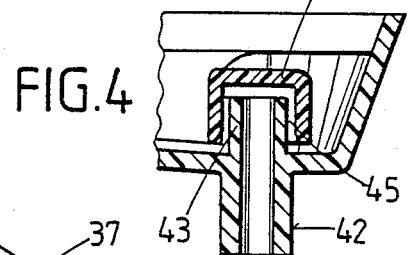
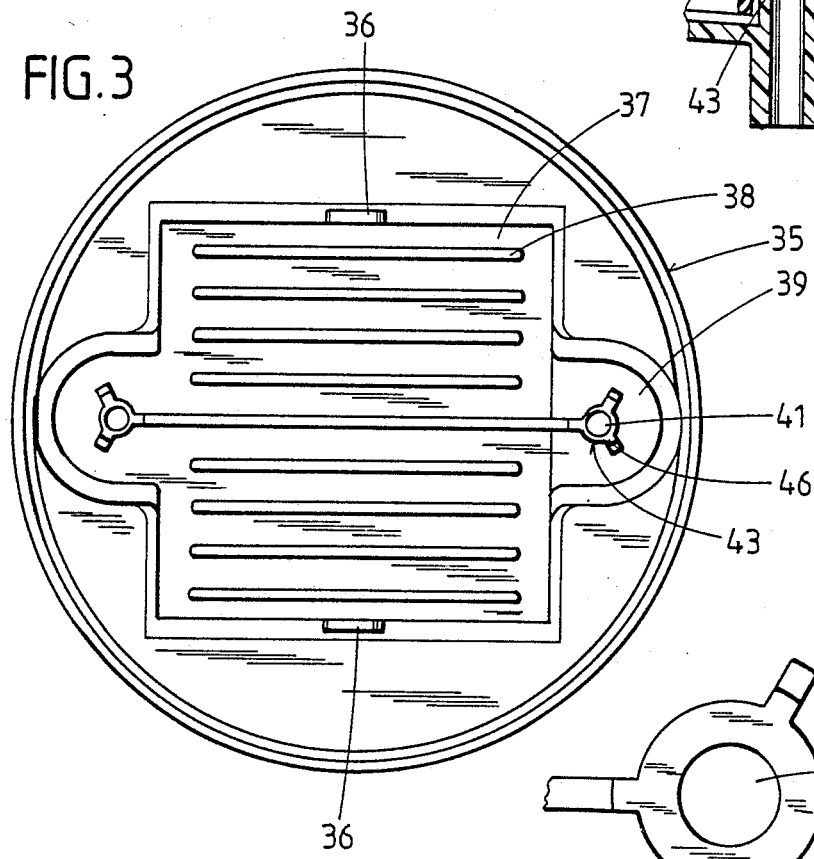
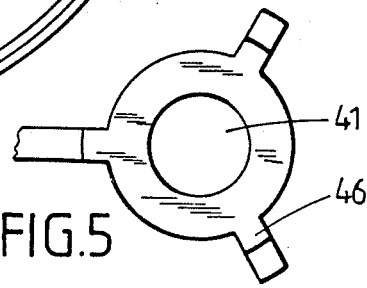

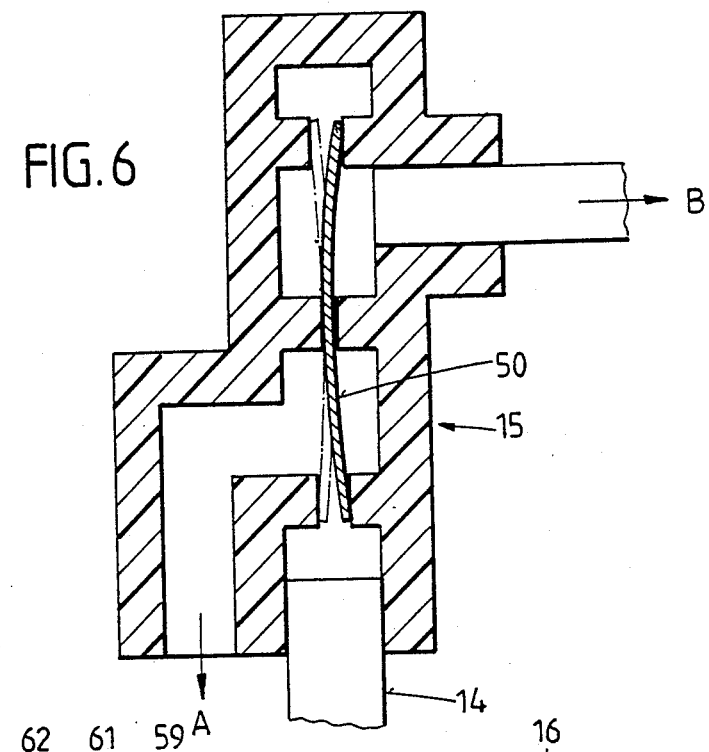
FIG. 6
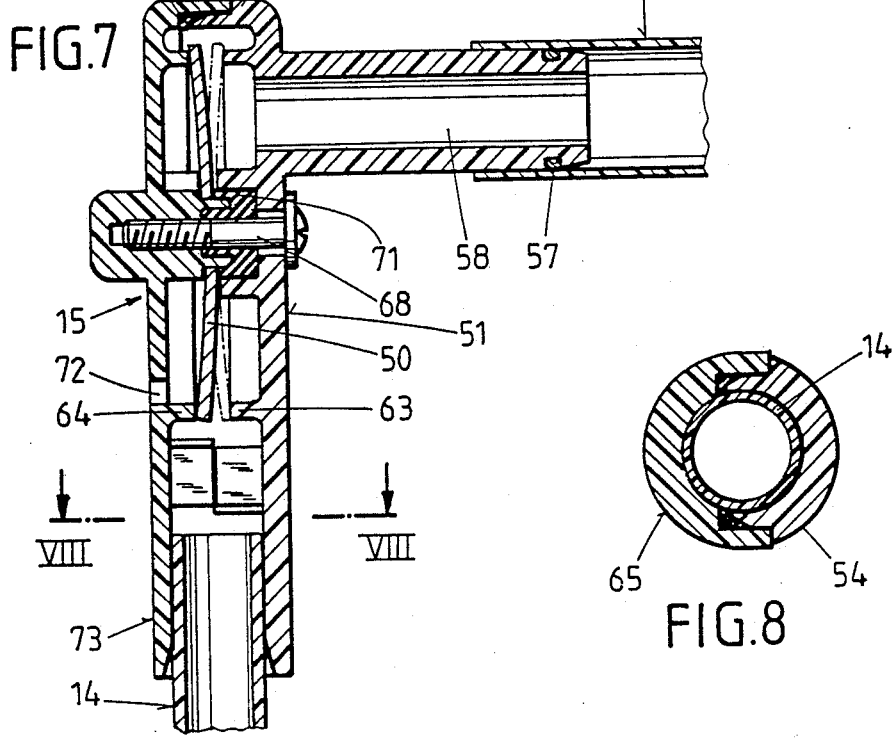
FIG. 7
FIG. 8

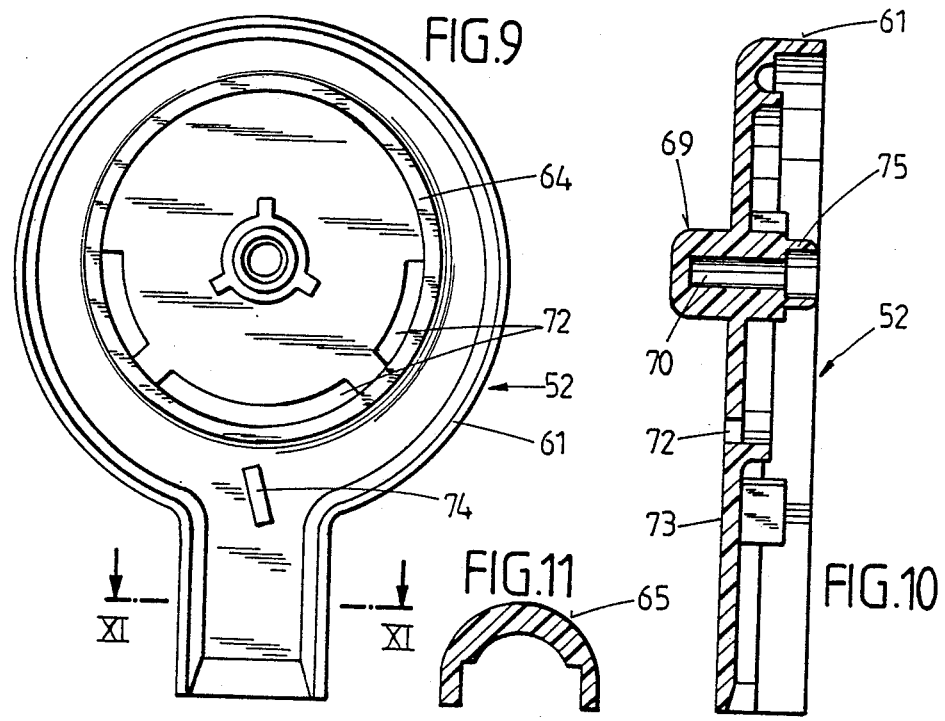
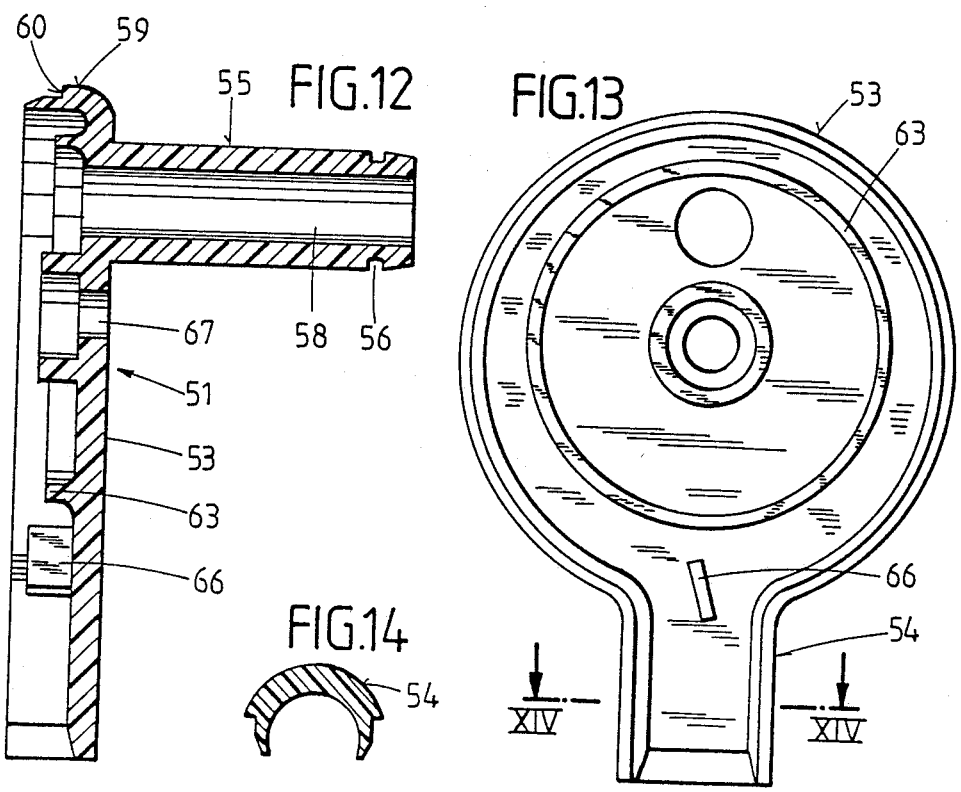

MACHINE FOR BREWING HOT BEVERAGES

CROSS-REFERENCE TO RELATED CASE

Certain parts of the machine of the present invention are identical with the corresponding parts of the machine which is disclosed in the commonly owned copending patent application Ser. No. 184,682 filed Apr. 22, 1988 by Josef HENN and Klaus BEUMER for "Machine for brewing coffee and other hot beverages".

BACKGROUND OF THE INVENTION

The invention relates to improvements in machines for brewing coffee, tea or other hot beverages. More particularly, the invention relates to improvements in machines wherein a hollow housing defines or accommodates a container for water, milk or another liquid (hereinafter called water) and wherein the temperature of water flowing from the container can be raised by a heater before the thus heated liquid enters a filter holder on its way into a pot, a carafe, a cup or another receptacle for hot beverages.

It is already known to provide a machine of the above outlined character with a conduit in the form of a riser which conveys freshly heated water from the heater to a distributor (hereinafter called manifold) serving to direct heated water back into the container or into the filter holder, depending upon whether or not the temperature of water in the riser is sufficient for the brewing of one or more cups of coffee, tea or another hot beverage. The manifold contains a normally disc-shaped deformable valving element which assumes a first shape or position when the temperature of water entering the manifold is too low and the valving element then permits such water to flow back into the container. The valving element changes its shape or position when the temperature of water reaches a desired value whereby the valving element seals the manifold from the container but permits properly or adequately heated water to enter the filter holder and to come in contact with a body of comminuted coffee beans, with a mass of comminuted tea leaves or with another agent which imparts to the beverage a desired flavor and color. The arrangement is such that the valving element snaps over from one position or shape to the other position or shape when the temperature of water which is supplied by the conduit rises above or drops below a given value. The filter holder is disposed at a level above a warming plate which can support a receptacle (such as a cup, a pot, a carafe or another suitable vessel) for the freshly brewed beverage. An advantage of machines which embody the above outlined valving element is that the filter holder can receive water only when the water temperature reaches or exceeds the value which is required for the making of a satisfactory hot beverage. Thus, the person in charge of operating the machine need not monitor the temperature of water and need not manually operate a valve in order to divert or direct heated water into the filter holder when the water temperature reaches or exceeds a desired value.

However, heretofore known machines which employ the above outlined valving elements still exhibit a number of drawbacks, particularly as concerns the complexity and cost of the manifold and the mode of installing the valving element in the manifold. As a rule, one side of the deformable valving element is affixed to a portion of the manifold.

OBJECTS AND SUMMARY OF THE INVENTION

An object of the invention is to provide a novel and improved machine for brewing coffee, tea or other hot beverages and to construct and assemble the machine in such a way that it exhibits all advantages of conventional machines but avoids their drawbacks in a simple and effective way.

Another object of the invention is to provide a novel and improved manifold for use in the above outlined machine.

A further object of the invention is to provide a novel and improved mode of mounting the deformable valving element in the manifold.

An additional object of the invention is to provide a novel and improved combination of manifold and deformable valving element for use in the above outlined machine.

Still another object of the invention is to provide a novel and improved method of making the manifold.

A further object of the invention is to provide a novel and improved combination of manifold, riser, filter holder and water container for use in the above outlined machine.

An additional object of the invention is to provide the manifold with novel and improved means for connecting it with the water-supplying conduit, with the container for water or another liquid which is to be heated, and with the filter holder.

The invention is embodied in a beverage brewing machine, such as a coffee maker or tea maker, which comprises a hollow housing, a water container which is preferably removably installed in the housing, a filter holder which is provided on the housing and has an intake for hot water, a water heater in the housing, a hot water conduit which is provided in the housing and has a first part adjacent the heater and a water-discharging second part, and a manifold having an inlet connected with the second part of the conduit, a first outlet connected with the intake of the filter holder, and a second outlet communicating with the water container. In accordance with a feature of the invention, the manifold comprises a first section which defines the first outlet, a second section which defines the second outlet, and a temperature-responsive valving element having a first portion which is held between the two sections and a second portion which is movable relative to the first portion and relative to the two sections between a first position which the second portion assumes when the temperature of water supplied by the conduit is below a given value (namely below a value which is satisfactory for the brewing of coffee, tea or another hot beverage) and in which the valving element seals the inlet only from the first outlet (i.e., water having a temperature below the given value can flow back into the water container), and a second position which the second portion assumes when the temperature of water supplied by the conduit is above the given value and in which the valving element seals the inlet only from the second outlet but permits sufficiently heated water to leave the manifold by way of the first outlet and to enter the filter holder where it is brought into contact with tea, coffee or another flavoring agent. The valving element can constitute a flexible disc, and the first portion of such valving element can constitute the central portion of the disc. The aforementioned conduit is preferably a riser, i.e., the first part of such conduit is located at a level below the second part. The conduit can have a third part communicating with the water container so that water is heated while flowing from the container, through the conduit and into the manifold.

The manifold further comprises means for preferably separably coupling the sections to each other and for simultaneously clamping the first portion of the valving element between the sections. One of the sections (such as the second section) can be provided with a preferably integral boss constituting a nut, and the other section is provided with a hole in register with the boss. The coupling means can comprise a threaded fastener having a shank extending through the hole and into a blind hole of the boss. The first portion of the valving element has an opening for the shank, and one of the sections is preferably provided with an integral sleeve-like bearing extending into the opening of the first portion of the valving element and surrounding the corresponding portion of the shank. The threaded fastener can have a head which abuts the outer side of the other section adjacent the hole in such section.

The sections can be provided with seats which flank the second portion of the valving element. The second portion of the valving element abuts the seat of the first section when the valving element seals the inlet of the manifold from the first outlet, and the second portion of the valving element abuts the seat of the second section when the valving element seals the inlet of the manifold from the second outlet, i.e., when the temperature of water issuing from the second part of the conduit is sufficiently high for the brewing of coffee, tea or another hot beverage. Each seat can constitute a substantially ring-shaped abutment for the second portion of the valving element.

The sections of the manifold are preferably provided with spaced-apart bottom walls and with neighboring rims which are integral with the respective bottom walls and extend toward each other. Such manifold further comprises sealing means (e.g., an O-ring or another ring-shaped sealing element) which is interposed between the rims. One of the rims can be telescoped into the other rim, and the one rim is preferably provided with an external shoulder which abuts or is closely adjacent the end face of the other rim.

One of the outlets of the manifold can include apertures in the bottom wall of the respective section Such apertures are preferably provided in or constitute the second outlet which returns insufficiently heated water into the container. The apertures are preferably at least substantially equidistant from the coupling means. Each such aperture can constitute or resemble an arcuate slot, and the slots together form at least a portion of an annulus which substantially concentrically surrounds the coupling means. At least one of the slots can be longer (in the circumferential direction of the annulus) than at least one other slot, and the width of all slots (in the adial direction of the annulus) is or can be the same.

At least one of the sections can comprise a pipe (e.g., a nipple) which defines the respective outlet. For example, the first section can be provided with a pipe-like outlet and the intake of the filter holder can include a second pipe. One of these pipes extends into the other pipe, and such machine further comprises sealing means which is interposed between the two pipes. For example, the pipe of the first section can have a circumferentially complete external groove for an O-ring, and such pipe is inserted into the intake of the filter holder.

Each of the sections can be provided with an extension, and the extension can jointly define the inlet of the manifold. Such inlet can be formed by a pipe or tube one half of which can constitute a first substantially trough-shaped shell formd by one of the extensions and the other half of which can constitute a second substantially trough-shaped shell formed by the other extension. The second part of the conduit can extend into such two-piece inlet of the manifold.

At least one of the sections can have an internal guide in the region of the inlet of the manifold. If the inlet is a tube, the guide can constitute a guide vane which is an integral part of the respective bottom wall and is preferably inclined with reference to the axis of the tube.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged central vertical sectional view of an insert which is installed in the filter holder when the machine is to brew a smaller quantity of coffee, tea, chocolate or another hot beverage;

FIG. 3 is a plan view of the insert which is shown in FIG. 2;

FIG. 4 is an enlarged view of a detail in the insert of FIG. 2;

FIG. 5 is an enlarged view of a detail in the insert of FIG. 3;

FIG. 6 is an enlarged schematic vertical sectional view of the manifold with the valving element, inlet and outlets;

FIG. 7 is a central vertical view of the presently preferred embodiment of the manifold with its separable sections, valving element, coupling means, inlet and outlets, and further showing the second part of the conduit and the intake of the filter holder;

FIG. 8 is a horizontal sectional view of the inlet of the manifold and of the conduit as seen in the direction of arrows from the line VIII—VIII of FIG. 7;

FIG. 9 is a front elevational view of one section of the manifold which is shown in FIG. 7;

FIG. 10 is a vertical sectional view of the manifold section of FIG. 9;

FIG. 11 is a horizontal sectional view of the extension of the manifold section of FIGS. 9 and 10, substantially as seen in the direction of arrows from the line XI—XI of FIG. 9;

FIG. 12 is a central vertical sectional view of the other section of the manifold which is shown in FIG. 7;

FIG. 13 is a front elevational view of the second section as seen from the left-hand side of FIG. 12; and FIG. 14 is a horizontal sectional view of the extension of the other section, substantially as seen in the direction of arrows from the line XIV—XIV of FIG. 13.

DESCRIPTION OF THE PREFERRED EMBODIMENTS

Figure 1:
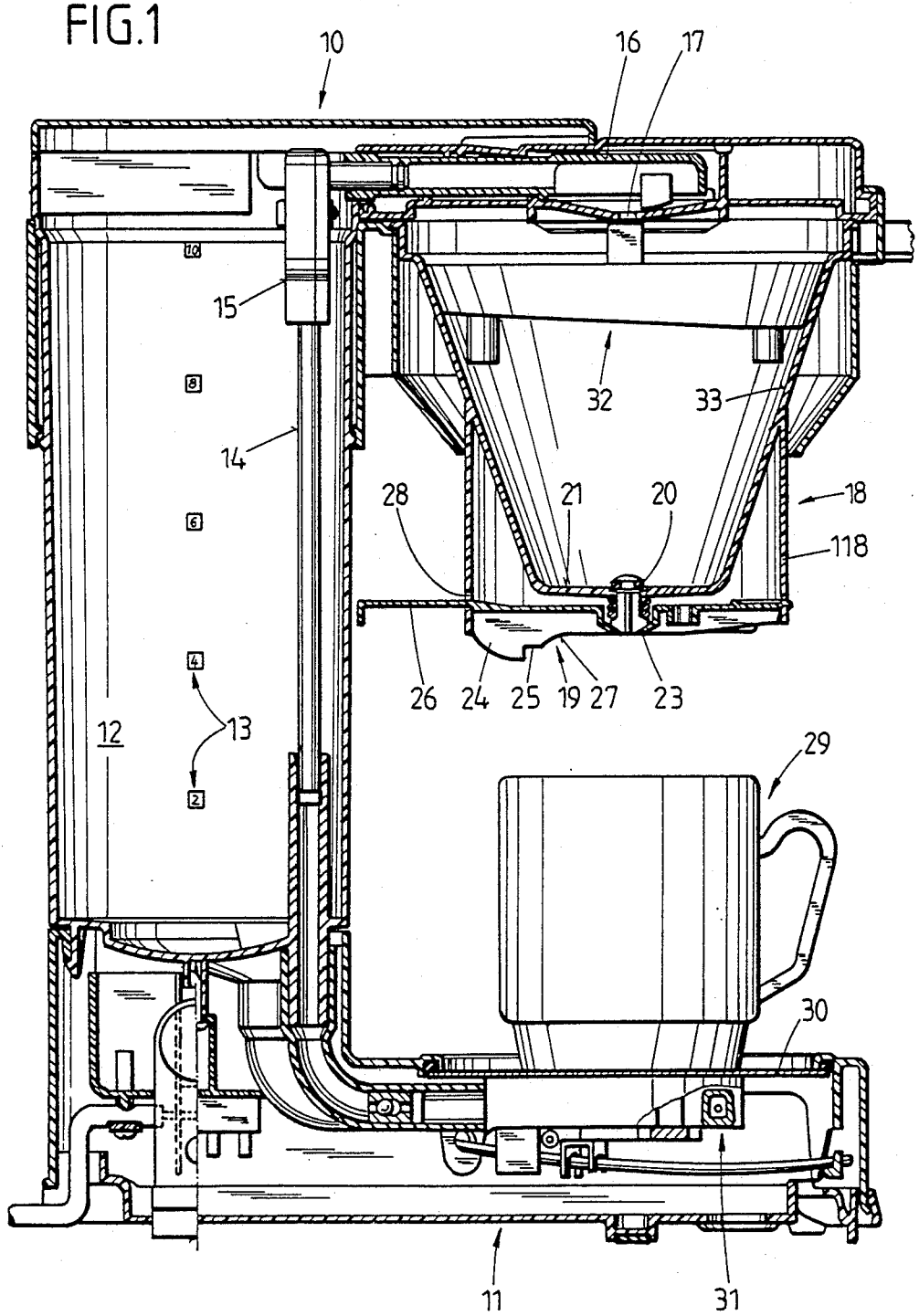
FIG. 1 is a partly elevational and partly vertical sectional view of a beverage brewing machine which embodies the invention, further showing a cup on the warming plate beneath the filter holder.

The drawing merely shows those components of the improved brewing machine 10 which are necessary for full understanding of the invention. For example, the drawing does not show the knobs, levers and other actuating elements of the machine, the electric circuit, and the means for connecting the machine with a source of electrical energy. All components which are not shown but are or could be used in the improved machine can be of the type employed in available machines, for example, in a machine known as "Euro/-Brew Signal" coffee maker No. 152 which is distributed by the assignee of the present application.

The machine 10 which is shown in FIG. 1 can be used for the brewing of coffee and comprises a substantially L-shaped hollow housing having a base 11 which carries a warming plate 30 at a level above an electric heater 31. The plate 30 supports a coffee cup 29 but can also support a pot, a carafe or any other suitable vessel for one or more portions of hot coffee. In addition to the heater 31, the hollow housing of the machine 10 accommodates a removable upright water container 12 which is preferably made of a light-transmitting material, at least in the region of a row of markers 13 which denote the quantities of confined liquid (normally water). As shown, the container 12 can be designed to confine a supply of fresh water which suffices to make a total of ten regular cups of coffee. The illustrated container 12 occupies the major portion of the interior of the hollow housing of the machine 10. If desired, the container 12 can form an integral part of the housing, and the latter is then provided with a removable cap which normally seals the upper end of the container but can be detached in order to permit replenishment of the supply of fresh water.

A conduit 14 in the hollow housing of the machine 10 has a first portion adjacent the heater 31, a second portion attached to the inlet of a distributor or manifold 15 in the housing, and a third portion connected to the outlet of the container 12. When a suitable valve in the conduit 14 is opened, fresh water flows from the container 12 past the heater 31, which raises the temperature of flowing water, and into the manifold 15. The conduit 14 is a riser which conveys heated water into the interior of the manifold 15 wherein the temperature of admitted hot water is monitored by a disc-shaped deformable valving element 50 (FIGS. 6 and 7). If the temperature of heated water is below a given value, the valving element 50 assumes the position or shape which is shown in FIG. 6 by solid lines and in FIG. 7 by phantom lines; at such time, the valving element 50 seals the water-discharging upper part of the conduit or riser 14 from the intake 16 of a filter holder 18 but permits water to flow back into the container 12. If the temperature of water rising in the conduit 14 reaches or exceeds the given value which is satisfactory for the brewing of one or more cups of hot coffee, the valving element 50 assumes the shape or position which is shown in FIG. 6 by phantom lines and in FIG. 7 by solid lines; the conduit 14 is then sealed from the container 12 but hot water is free to enter the intake 16 of the filter holder 18. The transition from one position or shape to the other position or shape of the valving element 50 is abrupt, i.e., the marginal (second) portion of the valving element 50 simply snaps over from the one position to the other position, depending upon whether the temperature of water which is supplied by the conduit 14 is at or above the given value or has dropped below such given value.

The intake 16 of the filter holder 18 is a horizontal pipe which is installed in the upper portion of the hollow housing of the machine 10 and can deliver hot water to an opening 17 for admission into a chamber which accommodates a supply of comminuted (e.g., pulverized) coffee beans. As a rule, the filter holder 18 will receive a hollow conical filter paper which is inserted into the aforementioned chamber and contains a requisite supply of comminuted coffee beans.

FIG. 1 further shows a specially designed insert 32 which is removably installed in the upper portion of the filter holder 18 and the details of which are shown in FIGS. 2 to 5. The insert 32 is employed when the operator wishes to brew only a relatively small quantity, e.g., one or two portions, of hot coffee.

The insert 32 can be made of a suitable non-metallic (plastic) material and resembles a relatively shallow pan with a non-horizontal bottom wall 34 and an upwardly extending rim 35 which is integral with the marginal portions of the bottom wall 34. The inclination of the outer side of the rim 35 preferably matches or approximates the inclination of the frustoconical internal surface 33 surrounding the aforementioned filter chamber in the holder 18. This renders it possible to install the insert 32 in the holder 17 in an optimum position such as is shown in FIG. 1. In order to facilitate placing of the insert 32 into and its extraction from the upper portion of the filter holder 18, the insert 32 is preferably provided with one or more handles 36 in the form of upwardly extending lugs which are integral with the bottom wall 34.

The central portion of the inner (upper) side of the bottom wall 34 of the insert 32 is provided with a square or rectangular depression or recess 37. Parallel supporting ribs 38, which are integral parts of the bottom wall 33, extend into the recess 37 to carry at least one porous bag (not shown) made of filter paper and containing a requisite supply of comminuted coffee beans, i.e., a supply which suffices for the making of the aforementioned relatively small quantity of hot coffee. The configuration of the bag (which is a commercially available product) normally matches or resembles the shape of the recess 37. It is equally within the purview of the invention to furnish the machine 10 with an insert 32 which has a differently configured (e.g., substantially circular, oval, hexagonal or other) outline, depending on the outline of the bag which is to be placed onto the supporting ribs 38. The recess 37 can be dimensioned to receive a layer consisting of two or more bags. Moreover, the ribs 38 need not be parallel and equidistant from each other; for example, the bottom wall 34 can be provided with one ring-shaped rib or with two or more concentric or nonconcentric ring-shaped ribs. Still further, the ribs 38 can extend across the full width of the recess 37, they can be shorter than those shown in FIG. 3, or some of the ribs can be longer than the other ribs.

The recess 37 has two substantially semicircular extensions 39 which are located opposite each other. The central portion of such extension 39 communicates with the hole 41 of a discrete upright pipe 40 having a lower portion 42 extending below the bottom wall 34 and an upper portion 43 extending into the respective extension 39. Each of the pipes 40 can act as a siphon to convey freshly brewed coffee from the insert 32 into the lower portion of the filter holder 18. The pipes 40 are preferably integral parts of the bottom wall 34.

The upper portion 43 of each pipe 40 is spacedly surrounded by an inverted cup-shaped hood 44 (see FIG. 4) which rests on suitably distributed legs 46 (FIGS. 3 and 5) forming part of or bonded to the bottom wall 34 and surrounding the respective upper portion 43. The arrangement is such that the hoods 44 and the respective upper portions 43 define clearances 45 which permit freshly brewed hot coffee to overflow from the recess 37 of the insert 32 into the lower portion of the filter holder 18. The legs 46 are located at a level such that the hood 44 resting thereon cannot sealingly engage the upper end face of the respective upper portion 43, i.e., the hood 44 cannot seal the recess 37 from the lower portion of the filter chamber in the holder 18.

The upper end of the upper portion 43 of the left-hand pipe 40 of FIG. 2 is located at a level above the upper end of the upper portion 43 of the right-hand pipe 40 when the insert 32 is properly installed in the holder 18. This is due to inclination of the bottom wall 34 with reference to a horizontal plane; however, the same result can be achieved by making one of the upper portions 43 longer than the other. In view of such difference between the levels of the upper ends of upper portions 43, one of the siphons becomes effective ahead of the other siphon, i.e., freshly brewed coffee begins to overflow from the recess through the hole 41 of the right-hand pipe 40 of FIG. 2 or 3 before the left-hand pipe 40 begins to convey a stream of hot coffee.

When the valving element 50 in the manifold 15 assumes the solid-line position of FIG. 7, hot water is free to flow from the conduit 14 into the intake 16 and thence into the opening 17 to flow onto the porous bag or bags on the supporting ribs 38 and to gather in the recess 37 and its extensions 39. The recess 37 actually gathers a supply of freshly brewed coffee because the liquid which accumulates therein has already contacted comminuted coffee beans in the bag or bags on the supporting ribs 38.

As the supply of freshly brewed coffee rises in the main portion of the recess 37, it also rises in the annular clearances 45 between the upper portions 43 of the pipes 40 and the respective hoods 44. When the upper level of freshly brewed coffee in the insert 32 reaches the upper end of the right-hand upper portion 43 of FIG. 2, it overflows into the respective hole 41 and the respective pipe 40 then acts as a siphon, i.e., it conveys a stream of hot coffee into the lower portion of the holder 18. The left-hand pipe 40 of FIG. 2 becomes effective (i.e., it begins to act as a siphon) when the level of freshly brewed coffee in the insert 32 rises to the level of the upper end of its upper portion 43.

The stream or streams of coffee which flow from the insert 32 via pipe or pipes 40 gathering the lower portion of the holder 18 on a normally closed gate 19 including a lever (not specifically referenced) the right-hand end of which is pivotable about a substantially horizontal axis defined by a pivot member on the holder 18 so that the gate 19 can be moved to open (raised) or closed (lowered) position. The central portion of the lever carries a valving element which is biased by a spring 23 so that it normally seals an aperture 20 in the bottom wall 21 of the filter holder 18. If the lever is pivoted from the operative position of FIG. 1 in which the gate 19 prevents freshly brewed coffee from leaving the chamber of the filter holder 18 by way of the aperture 20 and into the cup 29, the spring 23 yields and enables the valving element on the lever to expose the aperture 20 in the bottom wall 21.

The lever of the gate 19 can be pivoted in a number of ways. As shown in FIG. 1, the gate 19 includes a relatively wide portion 24 with a stop 25 which is flanked by two walls extending at right angles to each other. The stop 25 is located behind a suitably configurated cam face 27 of the gate 19. The distance between the cam face 27 and stop 25 on the one hand, and the warming plate 30 on the base 11 of the housing of the brewing machine 10 on the other hand, is selected in such a way that when a specially dimensioned coffee pot (e.g., a vessel made of glass or another light-transmitting material) is placed onto and slid along the warming plate 30, the upper part of such pot engages the came face 27 and pivots the lever of the gate 19 upwardly about the substantially horizontal axis against the opposition of the spring 23 so that the valving element on the lever exposes the aperture 20 in the bottom wall 21 of the filter holder 18. The stop 25 can serve to arrest the pot in an optimum position with reference to the warming plate 30 and filter holder 18. The valve on the lever of the gate 19 opens only when the open upper end of the pot is already located beneath the aperture 20 so that hot coffee issuing from the chamber of the filter holder 18 cannot spill onto the warming plate 30 and/or onto the base 11. The just discussed pot is used when the machine 10 is to make a larger quantity (e.g., ten cups) of hot coffee. At such time, the insert 32 is removed from the filter holder 18 and the latter confines a hollow conical filter paper confining a requisite quantity of comminuted coffee beans.

If the machine 10 is used with the insert 32 installed in the upper portion of the filter holder 18 as shown in FIG. 1, and the operator of the machine wishes to fill a single cup 29, the upper portion of such cup is located well below the gate 19 when the cup rests on the warming plate 30. The operator then simply lifts the cup 29 so that the rim of the cup engages the stop 25 adjacent the cam face 27. As the operator pushes the cup 29 upwardly, the lever of the gate 19 pivots about its substantially horizontal axis against the resistance of the spring 23, and the valving element on the lever of the gate 19 exposes the aperture 20 so that freshly brewed coffee flows into the cup 29 as long as the latter maintains the gate 19 in open position. As mentioned above, the stop 25 is bounded by two walls which are disposed at right angles to each other; this is desirable and advantageous because it enables the operator to maintain the lifted cup 29 in an optimum position for pivoting of the lever of the gate 19 at a time when the open upper end of the cup is located below the aperture 20 in the bottom wall 21 of the filter holder 18. The operator lowers the cup 29 when the latter is filled with freshly brewed coffee to a desired level, and this enables the spring 23 to return the valving element on the lever of the gate 19 to sealing position. The cup 29 is being filled by a continuously flowing stream of freshly brewed coffee as long as the spring 23 is compelled to store energy, i.e., as long as the aperture 20 remains exposed. The partly or completely filled cup 29 can be deposited on the warming plate 30 or can be transferred onto a saucer or held by its handle.

The aforementioned lever of the gate 19 has a projection or arm 26 which extends through and beyond a vertically extending slot 28 in a cylindrical skirt 118 surrounding the bottom wall 21 and the adjacent frustoconical portion of the holder 18. The arm 26 can be engaged and pushed or pulled upwardly by a finger or by an implement held by one hand of the operator to pivot the lever of the gate 19 in a direction to expose the aperture 20 and to thus permit a stream of freshly brewed coffee to leave the lower portion of the chamber in the filter holder 18. If the gate 19 is moved to the open position by way of the arm 26, the cup 29 can rest on the warming plate 30 while the chamber of the filter holder 18 is relieved of a portion of freshly brewed coffee. The length or right of the slot 28 in the skirt 118 of the filter holder 18 determines the extent to which the lever of the gate 19 can be pivoted to open position irrespective of whether the lever is pivoted by a pot which slides along the cam face 27, by the rim of a cup 29 which bears against the lever in the region of the stop 25, or by way of the arm 26. As shown in FIG. 1, the spring 23 normally maintains the arm 26 in engagement with the surface bounding the lowermost portion of the slot 28 to thus ensure that the aperture 20 is sealed.

FIG. 6 shows schematically the manifold 15 which is installed in the housing of the machine 10 between the upper part of the conduit 14, the intake 16 of the filter holder 18 and the water container 12. The arrow A indicates the direction of flow of insufficiently heated water from the conduit 14, through the manifold 15 and back into the container 12. The arrow B indicates the direction of flow of adequately heated water from the conduit 14, through the manifold 15 and into the intake 16. As explained above, the direction of flow of water is selected automatically by the deformable disc-shaped valving element 50 which is installed in the manifold 15 in a manner as shown in FIG. 7. The central or median (first) portion of the valving element 50 is clamped between the adjacent portions of the manifold 15, and the marginal (second) portion of the thus clamped valving element 50 is free to snap over from the phantom-line position to the solid-line position when the conduit 14 delivers a stream of relatively cold or insufficiently heated water, and to snap to the phantom-line position of FIG. 6 when the temperature of water which is supplied by the conduit 14 is sufficiently high to warrant admission of water into the intake 16 of the filter holder 18.

FIG. 7 shows that the manifold 15 is assembled of two sections 51 (shown in detail in FIGS. 12-14) and 52 (shown in detail in FIGS. 9-11). The manifold 15 further comprises means for separably coupling the sections 51, 52 to each other and for simultaneously clamping the median portion of the valving element 50 between the adjacent portions of the sections. The coupling means comprises a threaded fastener 68 whose head abuts the outer (exposed) side of the bottom wall 53 of the section 51 and whose shank extends through a hole 67 in the bottom wall 53, through a sleeve-like bearing 75 provided at the inner end of an enlarged portion or boss 69 forming an integral part of the bottom wall 73 of the section 52, and into a tapped bore or hole 70 of the boss 69. The latter can be said to constitute a nut which mates with the shank of the fastener 68. The sleeve-like bearing 75 of the boss 69 spacedly surrounds an intermediate portion of the shank of the fastener 68 and extends through a centrally located opening of the valving element 50.

Each of the sections 51, 52 can be made of a single piece of suitable plastic material which can stand the temperature of heated water, namely that temperature which is necessary to cause the valving element 50 to assume the solid-line position of FIG. 7.

Referring to the section 51 which is shown in FIGS. 12-14, the bottom wall 53 is integral with a substantially circular rim 59 which has an external annular shoulder 60 and is received in the rim 61 of the section 52 (see FIG. 7) in such a way that the end face of the rim 61 abuts or is closely adjacent the external shoulder 60 of the rim 59. A ring-shaped sealing element 62 is adjacent the end face of the rim 59 and bears against an internal shoulder of the rim 61 to prevent escape of water from the interior of the properly assembled manifold 15. The bottom wall 53 of the section 51 has a substantially circular shape and is integral with a nipple or pipe 55 which defines a first outlet 58 of the manifold 15 and is received in the intake 16 of the filter holder 18. The intake 16 is or can constitute a pipe whose internal surface is in deforming engagement with a ring-shaped sealing element 57 in an external annular groove 56 of the nipple 55.

The inner side of the bottom wall 53 of the section 51 is formed with a substantially ring-shaped abutment 63 which constitutes a seat for the marginal portion of the valving element 50 when the latter assumes the phantom-line position of FIG. 7, namely when the valving element 50 seals the conduit 14 from the nipple 55 and intake 16. The bottom wall 53 further comprises an extension 54 which resembles a relatively short trough-shaped shell and cooperates with a similar extension 65 (FIG. 11) of the bottom wall 73 of the section 52 to define for the manifold 15 and inlet which receives the upper part of the conduit 14 to supply water into the space between the bottom walls 53 and 73. The upper part of the conduit 14 can be a tight fit in the composite pipe or tube which includes the extensions 54, 65 f the bottom walls 53, 73. It is also possible to employ O-rings or other suitable sealing elements (FIG. 8) which are installed between the extensions 54, 65 and the upper part of the conduit 14 to prevent leakage of water into the adjacent portion of the housing of the machine 10.

The inner side of the bottom wall 53 is formed with a guide vane 66 which extends into the path of inflowing water and is preferably inclined with reference to the axis of the composite pipe or tube including the extensions 54 and 65. A similar guide vane 74 is provided at the inner side of the bottom wall 73 of the section 52 adjacent the locus where the extension 65 merges into the bottom wall 73.

The dimensions of the section 52 (shown in detail in FIGS. 9-11) equal or approximate those of the section 51. The section 52 defines a second outlet which provides a path for the flow of water from the interior of the manifold 15 into the container 12 when the temperature of water flowing from the upper part of the conduit 14 is below the aforementioned given value, i.e., when the valving element 50 assumes the phantom-line position of FIG. 7. The second outlet is defined by several arcuate slots 72 which are provided in the bottom wall 73 of the section 52 and together form a portion of an annulus which concentrically surrounds the threaded fastener 68 of the coupling means. The slots 72 are disposed at the same distance from the fastener 68, and the length of the median slot 72 (in the circumferential direction of the aforementioned annulus) is greater than that of the two outer slots 72. The width of all slots 72 is or can be the same. The number and/or combined length of the slots 72 can depart from that shown in FIG. 9. For example, the slots 72 can form a substantially complete annulus rather than one half as shown in FIG. 9.

The inner side of the bottom wall 73 of the section 52 has a ring-shaped abutment 64 which serves as a seat for the marginal portion of the valving element 50 when the latter seals the slots 72 from the upper end of the conduit 14, i.e., when the valving element 50 assumes the solid-line position of FIG. 7.

As can be seen in FIG. 10, the boss 69 extends outwardly as well as inwardly of the bottom wall 73 of the section 52. FIG. 7 shows that the shank of the threaded fastener 68 is surrounded by an elastic sealing element 71 which is fitted into a socket at the inner side of the bottom wall 53 of the section 51 and extends in part into the interior of the sleeve-like bearing 75 for the central portion of the valving element 50. The sealing element 71 prevents water from escaping by way of the hole 67 in tee bottom wall 53. The bearing 75 is surrounded by an annular shoulder which serves as a stop for the central portion of the valving element 50 when the latter is properly mounted on the bearing 75. The outermost portion of the sealing element 71 abuts the central portion of the valving element 50 when the latter is properly installed in the manifold 15 and the fastener 68 is applied to hold the sections 51 and 52 together. The external thread of the shank of the fastener 68 can serve to cut a thread into the surface surrounding the blind hole 70 in the boss 69.

As explained above, the insert 32 will be used if the operator of the machine 10 wishes to brew a relatively small quantity of hot coffee. The insert 32 is removed from the holder 18, and the chamber of this holder receives a hollow conical filter paper with a larger quantity of comminuted coffee beans, if the operator wishes to brew a larger quantity (e.g., a total of ten cups) of hot coffee. The warming plate 30 then supports a larger vessel, e.g., the aforediscussed pot, which can serve to automatically pivot the lever of the gate 19 so as to expose the aperture 20 in the bottom wall 21 of the holder 18 during sliding relative to the warming plate 30 toward its optimum position with reference to the aperture 20.

Valving elements 50 which change their shape in response to heating or cooling are well known in the art and are available on the market. In fact, such valving elements are furnished in a number of sizes and shapes and according to their ability to change shape in response to heating to one of a number of different temperatures. Thus, it is possible to select for use in the manifold 15 a valving element 50 which responds to a selected temperature of hot water flowing from the conduit 14 into and beyond the inlet (extensions 54, 65) of the manifold 15.

The improved machine 10 is susceptible of many additional modifications. For example, the size the and shape of the section 51 and/or 52 of the manifold 15 can depart from that shown in FIGS. 12-14 for the section 51 and in FIGS. 9-11 for the section 52. Furthermore, the fastener 68 constitutes but one form of coupling means which can be employed to separably connect the sections 51, 52 to each other. It is further possible to secure the median or central portion of the valving element 50 to one of the sections 51, 52 before such one section is coupled to the other section. Though it is preferred to employ the coupling means as a device for clamping the median portion of the valving element 50 between the adjacent portions of the sections 51 and 52, it is possible to employ discrete clamping means for the valving element 50 and discrete coupling means for the sections 51 and 52.

An important advantage of the improved brewing machine is that the entire manifold 15 can be produced of simple and inexpensive parts. Thus, each of the sections 51, 52 can constitute a one-piece member of plastic material, and such sections can be held together by a single fastener which can further serve to clamp the median or central portion of the valving element 50 between the two sections. The external shoulder of the sleeve-like bearing 75 renders it possible to mount the valving element 50 on the section 52 in an optimum position before the sections 51, 52 are coupled to each other by the fastener 68. The seats 63 and 64 are preferably integral parts of the respective bottom walls 53 and 73 to thus contribute to lower cost of the sections 51, 52 and to simplify the assembly of the manifold 15. The provision of rims 59 and 61 which are telescoped into each other when the sections 51, 52 are properly coupled to one another also contributes to lower cost of the manifold 15 and to simplicity of its assembly. The slots 72 can be machined into the bottom wall 73 of the section 52 but are preferably formed at the time the section 52 is made in an injection molding or other suitable plastic processing machine. It is clear that the combined area of the slots 72 should suffice to ensure that all of the water which is supplied by the conduit 14 can flow back into the container 12 when the valving element 50 assumes the phantom-line position of FIG. 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A beverage brewing machine comprising a hollow housing; a water container in said housing; a filter holder provided on said housing and having an intake; a water heater in said housing; a hot water conduit provided in said housing and having a first part adjacent said heater and a water-discharging second part; and a manifold having an inlet connected with the second part of said conduit, a first outlet connected with said intake, and a second outlet communicating with said container, said manifold comprising a first section defining said first outlet, a second section defining said second outlet, and a temperature-responsive valving element having a first portion held between said sections and a second portion movable between a first position which said second portion assumes when the temperature of water supplied by said conduit is below a given value and in which said element seals said inlet only from said first outlet, and a second position which said second portion assumes when the temperature of water supplied by said conduit is above said given value and in which said element seals said inlet only from said second outlet.

2. The machine of claim 1, wherein said element is a flexible disc and said first portion is the central portion of said disc.

3. The machine of claim 1, wherein said conduit is a riser and said first part is disposed at a level below said second part.

4. The machine of claim 1, wherein said manifold further comprises means for coupling said sections to each other and for clamping said first portion of said valving element between said sections.

5. The machine of claim 4, wherein one of said sections has a nut and the other of said sections has a hole in register with said nut, said coupling means including a threaded fastener having a shank extending through said hole and into said nut.

6. The machine of claim 5, wherein said nut includes a boss which is integral with said one section and has a blind hole for said shank, said first portion of said valving element having an opening for said shank and one of said sections having a bearing extending into said opening and surrounding said shank.

7. The machine of claim 5, wherein said nut is an integral part of said second section.

8. The machine of claim 1, wherein said sections have seats flanking the second portion of said valving element, said second portion abutting the seat of said first section when said valving element seals said inlet from said first outlet and said second portion abutting the seat of said second section when said valving element seals said inlet from said second outlet.

9. The machine of claim 8, wherein at least one of said seats includes a substantially ring-shaped abutment for the second portion of said valving element.

10. The machine of claim 1, wherein said sections have spaced apart bottom walls and neighboring rims, and further comprising sealing means interposed between said rims.

11. The machine of claim 10, wherein one of said rims is telescoped into the other of said rims.

12. The machine of claim 11, wherein said one rim has an external shoulder and the other of said rims has an end face abutting or closely adjacent said shoulder.

13. The machine of claim 1, wherein one of said sections has a bottom wall and the respective outlet includes apertures in said bottom wall.

14. The machine of claim 13, wherein said one section is said second section.

15. The machine of claim 13, further comprising means for coupling said sections to each other and for clamping the first portion of said valving element between said sections, said apertures being substantially equidistant from said coupling means.

16. The machine of claim 15, wherein said apertures are arcuate slots together forming a portion at least of an annulus which substantially concentrically surrounds said coupling means.

17. The machine of claim 16, wherein at least one of said slots is longer than at least one other slot in the circumferential direction of said annulus.

18. The machine of claim 16, wherein all of said slots have substantially the same width in the radial direction of said annulus.

19. The machine of claim 1, wherein one of said sections has a pipe which defines the respective outlet.

20. The machine of claim 19, wherein said one section is said first section and further comprising sealing means interposed between said pipe and said intake.

21. The machine of claim 20, wherein said intake comprises a second pipe and one of said pipes extends into the other of said pipes.

22. The machine of claim 19, wherein said pipe is a nipple.

23. The machine of claim 1, wherein each of said sections has an extension and said extensions jointly define said inlet.

24. The machine of claim 23, wherein each of said extensions constitutes a substantially trough-shaped shell and the second part of said conduit extends into said inlet.

25. The machine of claim 1, wherein at least one of said sections has internal guide means in the region of said inlet.

26. The machine of claim 25, wherein said inlet comprises a composite tube and said guide means is inclined with reference to the axis of said tube.

* * * * *